(12) United States Patent
Gupta et al.

(10) Patent No.: US 10,999,858 B2
(45) Date of Patent: May 4, 2021

(54) MULTIPLE GROUPINGS FOR GROUP CONTROL CHANNEL

(71) Applicant: QUALCOMM Incorporated, San Diego, CA (US)

(72) Inventors: Piyush Gupta, Bridgewater, NJ (US); Junyi Li, Chester, NJ (US); Chong Li, Weehawken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/405,207

(22) Filed: May 7, 2019

(65) Prior Publication Data

US 2019/0357231 A1 Nov. 21, 2019

Related U.S. Application Data

(60) Provisional application No. 62/673,071, filed on May 17, 2018.

(51) Int. Cl.
*H04W 72/12* (2009.01)
*H04L 5/00* (2006.01)
(Continued)

(52) U.S. Cl.
CPC ......... *H04W 72/121* (2013.01); *H04L 1/1614* (2013.01); *H04L 1/1671* (2013.01); *H04L 1/1887* (2013.01); *H04L 5/0037* (2013.01); *H04W 72/1273* (2013.01); *H04W 72/1289* (2013.01)

(58) Field of Classification Search
CPC ....... H04L 1/08; H04L 1/1614; H04L 1/1671; H04L 1/1887; H04L 1/1893; H04L 1/1896; H04L 5/001; H04L 5/0023; H04L 5/0035; H04L 5/0037; H04L 5/0044; H04L 5/0055; H04L 5/0082; H04L 5/0094; H04L 5/14; H04W 72/121; H04W 72/1273; H04W 72/1289; H04W 72/1294

See application file for complete search history.

(56) References Cited

U.S. PATENT DOCUMENTS

2013/0163536 A1* 6/2013 Anderson ............. H04L 5/0037
370/329
2018/0317213 A1* 11/2018 Islam ................... H04L 1/1822

OTHER PUBLICATIONS

Sequans Communications, "On Multiplexing of DL data with different transmission durations", R1-1800809, 3GPP TSG RAN WG1 Meeting AH 1801, Vancouver, Canada, Jan. 22-26, 2018. (Year: 2018).*

(Continued)

*Primary Examiner* — Saad A. Waqas
(74) *Attorney, Agent, or Firm* — QUALCOMM Incorporated

(57) ABSTRACT

Methods, systems, and devices for wireless communication are described. A wireless device may receive an indicator of resource allocation for a plurality of UEs, determine, based at least on a grouping of the plurality of UEs, resources from the resource allocation for receiving data at the UE, and receive the data on the determined resources. A base station may receive a plurality of acknowledgement reports from a plurality of UEs, determine, based on a grouping of the plurality of UEs, a resource allocation for each UE from which a negative acknowledgement was received, and transmit an indicator of the resource allocation.

31 Claims, 10 Drawing Sheets

(51) Int. Cl.
*H04L 1/16* (2006.01)
*H04L 1/18* (2006.01)

(56) References Cited

OTHER PUBLICATIONS

Huawei et al., "Remaining Aspects on Pre-emption Indication for DL Multiplexing of URLLC and eMBB", R1-1721452, 3GPP TSG RAN WG1 Meeting # 91, Reno, USA, Nov. 27-Dec. 1, 2017. (Year: 2017).*
International Search Report and Written Opinion—PCT/US2019/032208—ISA/EPO—dated Jul. 17, 2019.

* cited by examiner

MULTIPLE GROUPINGS FOR GROUP CONTROL CHANNEL

CROSS-REFERENCE TO RELATED APPLICATIONS

This application claims priority to co-pending U.S. Provisional Application No. 62/673,071, entitled "MULTIPLE GROUPINGS FOR GROUP CONTROL CHANNEL," filed May 17, 2018, the disclosure of which is hereby incorporated herein by reference.

BACKGROUND

The following relates generally to wireless communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support multiple groupings for group downlink control messages. A method of wireless communication is described. The method may include receiving an indicator of resource allocation for a plurality of UEs, determining, based at least on a grouping of the plurality of UEs, resources from the resource allocation for receiving data at the UE, and receiving the data on the determined resources.

An apparatus for wireless communication is described. The apparatus may include a processor, a memory in electronic communication with the processor, and instructions stored in the memory. The instructions may be executable by the processor to cause the apparatus to receive an indicator of resource allocation for a plurality of UEs, determine, based at least on a grouping of the plurality of UEs, resources from the resource allocation for receiving data at the UE, and receive the data on the determined resources.

A non-transitory computer readable medium storing code for wireless communication is described. The code may include instructions executable by a processor to receive an indicator of resource allocation for a plurality of UEs, determine, based at least on a grouping of the plurality of UEs, resources from the resource allocation for receiving data at the UE, and receive the data on the determined resources.

Another apparatus for wireless communication is described. The apparatus may include means for receiving an indicator of resource allocation for a plurality of UEs, means for determining, based at least on a grouping of the plurality of UEs, resources from the resource allocation for receiving data at the UE, and means for receiving the data on the determined resources.

In some examples of the method, apparatuses, or non-transitory computer-readable medium described herein, the second configuration comprises a periodicity of CSI report transmissions greater than a periodicity of CSI report transmissions of the first configuration. In some instances, the data comprises a retransmission of a prior missed transmission. In some instances, the indicator of resource allocation includes a bitmap indicating which UEs in the plurality of UEs reported a negative acknowledgement for a prior transmission. In some instances, the determining resources comprises determining a number of resource blocks associated with a group of the grouping to which the UE belongs and identifying a location of the number of resource blocks based on a predefined mapping of resources for UEs within the group. In some instances, the number of resource blocks associated with the group is based on a modulation and coding scheme (MCS) associated with UEs in the group. In some cases, the indicator of resource allocation comprises a group Physical Downlink Control Channel (PDCCH) for allocating resources for a particular group of the grouping.

In some cases, the indicator of resource allocation includes a bitmap indicating which UEs in the particular group reported a negative acknowledgement for a prior transmission. In some instances, the indicator of resource allocation further includes a starting and ending resource index for resources assigned to the particular group. In some instances, the determining resources comprises determining that resources assigned to the particular group are uniformly divided among each UE within the particular group that reported a negative acknowledgement for a prior transmission. In some instances, the indicator of resource allocation further includes a starting resource index and a number of resources allocated to each UE within the particular group that reported a negative acknowledgement for a prior transmission. Some examples of the method, apparatuses, or non-transitory computer-readable medium described herein may further include processes, features, means, or instructions for monitoring for the group PDCCH based on the UE belonging to the particular group. In some cases, the grouping is based at least in part on a pathloss associated with each of the plurality of UEs.

A method of wireless communication is described. The method may include receiving a plurality of acknowledgement reports from a plurality of user equipments (UEs), determining, based on a grouping of the plurality of UEs, a resource allocation for each UE from which a negative acknowledgement was received, and transmitting an indicator of the resource allocation.

An apparatus for wireless communication is described. The apparatus may include a processor, a memory in electronic communication with the processor, and instructions stored in the memory. The instructions may be executable by the processor to cause the apparatus to receive a plurality of acknowledgement reports from a plurality of user equipments (UEs), determine, based on a grouping of the plurality of UEs, a resource allocation for each UE from which a negative acknowledgement was received, and transmit an indicator of the resource allocation.

A non-transitory computer readable medium storing code for wireless communication is described. The code may include instructions executable by a processor to receive a plurality of acknowledgement reports from a plurality of user equipments (UEs), determine, based on a grouping of the plurality of UEs, a resource allocation for each UE from which a negative acknowledgement was received, and transmit an indicator of the resource allocation.

An apparatus for wireless communication is described. The apparatus may include means for receiving a plurality of acknowledgement reports from a plurality of user equipments (UEs), means for determining, based on a grouping of the plurality of UEs, a resource allocation for each UE from which a negative acknowledgement was received, and means for transmitting an indicator of the resource allocation.

Some examples of the method, apparatuses, or non-transitory computer-readable medium described herein may further include processes, features, means, or instructions for determining the grouping based on at least one of channel conditions, aggregation level requirement, or modulation and coding scheme (MCS) for each UE in the plurality of UEs. In some instances, UEs with similar channel conditions, aggregation level requirement, or MCS are grouped into a same group. In some instances, the indicator of resource allocation includes a bitmap indicating which UEs in the plurality of UEs reported a negative acknowledgement for a prior transmission. In some instances, the indicator of resource allocation comprises a group Physical Downlink Control Channel (PDCCH) for allocating resources for a particular group of the grouping. Some examples of the method, apparatuses, or non-transitory computer-readable medium described herein may further include processes, features, means, or instructions for transmitting a separate group PDCCH for each group of the grouping. In some instances, the the indicator of resource allocation includes a bitmap indicating which UEs in the particular group reported a negative acknowledgement for a prior transmission. In some instances, the indicator of resource allocation further includes a starting and ending resource index for resources assigned to the particular group. In some instances, the indicator of resource allocation further includes a starting resource index and a number of resources allocated to each UE within the particular group that reported a negative acknowledgement for a prior transmission.

DETAILED DESCRIPTION

Figure 1:
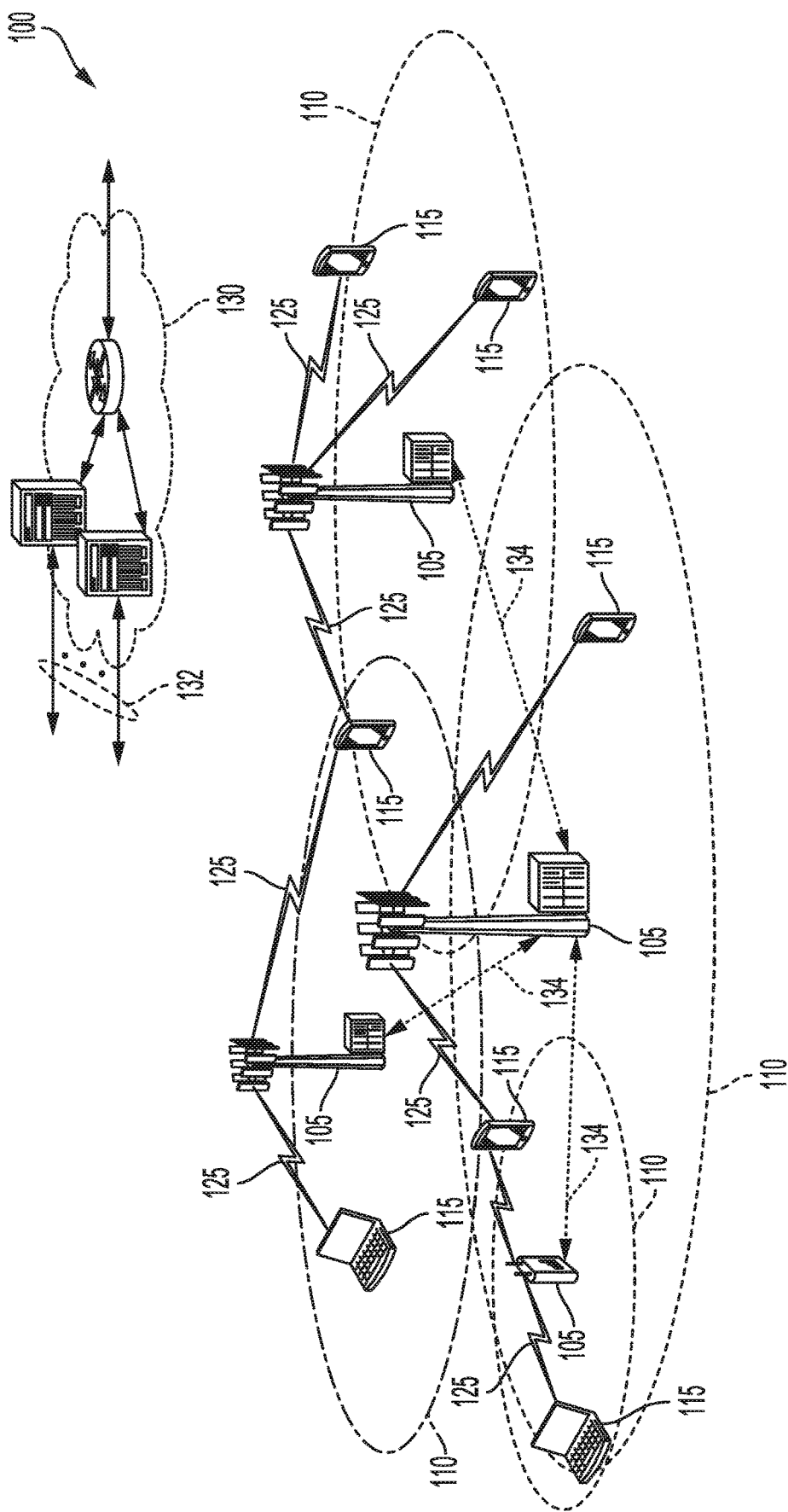
FIG. 1 illustrates an example of a system for wireless communication that supports multiple groupings for group control signal in accordance with aspects of the present disclosure.

In various aspects of the disclosure, wireless communications may use group control signals (e.g., group Physical Downlink Control Channel (PDCCH)) for assigning resources to a plurality of user equipments (UEs). For example, instead of sending separate resource assignments to each of the plurality of UEs, a base station may send a group resource assignment from which each of the plurality of UEs may uniquely derive its resource assignment. The transmission of a group resource assignment may reduce overhead associated with control channel transmissions, including cyclic redundancy check (CRC) bits and higher aggregation levels associated with each control channel transmission. Transmission of a group resource assignment, however, may be associated with some inefficiencies, especially if there are a large number of UEs monitoring the group resource assignment. For example, different UEs monitoring a group resource assignment may operate under different channel conditions. Accordingly, a group resource assignment intended to be decoded by each of the recipient UEs may need a particular aggregation level or modulation and coding scheme (MCS) tailored to UEs having the poorest channel conditions, while UEs having better channel conditions may experience inefficient resource usage associated with the group resource assignment. Various techniques disclosed herein provide for group resource assignment transmission according to characteristics of different groups of UEs, such as aggregation level or modulation and coding scheme (MCS) requirements.

Wireless communication networks may, in some instances, employ Coordinated MultiPoint (CoMP) transmission/reception to improve resource utilization or manage interference within a communication network. The coordinated aspect of CoMP may be contrasted with uncoordinated single-cell transmissions where a base station may communicate with user equipments (UEs) within its serving area with little or no coordination with neighboring cells. CoMP deployments may include various schemes for coordinating transmission and reception in a network, such as, for example, coordinated scheduling, beamforming, or joint transmissions. In some instances, CoMP deployments are suitable for (and may improve operational efficiency and interference management in) dense environments involving large numbers of UEs and/or transmission/reception points (TRPs), which may include spatially separated macro base stations, picocells, remote radio heads, small cells, access points, and the like, as used herein. The high degree of coordination among the TRPs in a CoMP deployment for coordinated scheduling, transmission, and exchange of control information may be facilitated by a high bandwidth backhaul connecting the TRPs (e.g., using X2 interface).

One example of a dense network environment that may benefit from CoMP deployments is a factory automation scenario. Although some of the examples discussed in the present disclosure are in the context of factory automation, other scenarios in which CoMP and multi-scale channel condition reporting are used are also within the scope of the present disclosure. In a factory automation setting, multiple sensor/actuator (S/A) units may be controlled by programmable logic controller (PLC) units. Examples of S/A units may include rotary motors, linear servos, actuators, position sensors, etc. The PLC units may receive sensor inputs (e.g., position) from the S/A units and transmit commands to the S/A units in real-time. Further, the PLC units may need to coordinate with other PLC units to manage the S/A units, and may therefore be interconnected (e.g., via a backhaul using X2 interface). In some instances, human machine interfaces (HMIs) may connect the PLC units with a management system, such as an industrial computer. The S/A units may communicate wirelessly with the PLC units, while the PLC units may be interconnected via a backhaul link to coordinate scheduling of transmissions to and from the S/A units. In certain instances, the factory automation setting may utilize CoMP schemes to manage the communications among PLC units and S/A units. Accordingly, in a factory automation context, the PLC units may be considered TRPs and the S/A units may be considered UEs.

The implementation of CoMP in factory automation settings may improve reliability of communications in a highly dynamic environment. For example, in an indoor environment with potential for numerous reflections due to the physical location of machines and objects, coupled with fast-moving machine parts, fading and shadowing effects may degrade network performance where a S/A unit may lose connection with a serving TRP, while not having enough time to re-associate with a TRP before the environment changes again. The spatial diversity of the TRPs serving UEs in a factory environment may help improve reliability by providing multiple access points for UEs to select from based on the diverse and changing environment, and coordinated transmissions through multiple TRPs may facilitate communications among the dense collection of UEs and TRPs in a factory environment while minimizing interference.

The traffic profile of communications in a factory automation setting may be mostly periodic, mission-critical communications comprising cyclic exchanges among PLC units and S/A units. The factory environment may include hundreds or thousands of production cells, where cell size may be relatively small compared to cells typically found in wide area networks. Accordingly, some factory environments may have stringent latency or reliability requirements to meet the needs of automated factory operations. In some instances, ultra-reliable/low-latency communications (URLLC) are used to meet the above requirements. Such communications may be associated with stringent latency and reliability requirements and may be utilized in a variety of scenarios, including emergency management communications, vehicle-based communications, factory automation communications, and the like.

Some URLLC communications may be suitable for semi-persistent scheduling (SPS) protocols. For example, in factory automation deployments URLLC communications may be periodic in nature, may involve a rather consistent or small amount of data to be communicated, which may be suitable for SPS protocols. SPS protocols typically include preconfigured resources that are used for the URLLC communications. One issue that may arise in the above scenario is when SPS messages are not received and/or decoded by the receiving device (e.g., a UE). In this instance, the UE may transmit a negative acknowledge (NACK) message (e.g., as part of a hybrid acknowledgment repeat request (HARQ) procedure) to the base station indicating that the SPS message was not received and/or decoded. In response, the base station may allocate new resources to retransmit the SPS message, e.g., resources outside of the preconfigured SPS resources, and transmit an indication of the resources in a new grant to the UE in a dynamic scheduling transmission, in contrast to a semi-persistent scheduling transmission.

According to some conventional protocols, retransmission resource grants may be provided on a per-UE basis. When there are many UEs, the control channel may be overwhelmed or, in some instances, may not have sufficient resources available to transmit all of the grant messages. This situation may be even further exacerbated in the situation where some or all of the UEs transmitting NACK messages have high aggregation levels. In some instances, a group resource allocation (e.g., a group Physical Downlink Control Channel transmission) may be transmitted to a plurality of UEs, with each UE decoding the group resource allocation and determining particular resources for receiving retransmissions. One issue with group resource allocation, however, is if the UEs receiving the group resource allocation are operating under substantially different channel conditions. The transmission of one group resource allocation intended for UEs having a wide range of coverage needs may result in inefficient signaling. For example, to ensure that each UE receiving the group resource allocation can accurately decode the grant, a base station may need to transmit the group resource allocation with modulation or repetition level suitable for the UE operating under the poorest channel conditions. Accordingly, various aspects of the present disclosure provide for group resource allocation transmission according to characteristics of different groups of UEs, such as aggregation level or modulation and coding scheme (MCS) requirements. The transmission of group resource allocations according to characteristics of the receiving UEs may reduce overhead and improve operational efficiency for dynamic resource scheduling, such as for retransmission resource allocation.

Aspects of the disclosure are initially described in the context of a wireless communications system. Aspects of the disclosure are further illustrated by and described with reference to apparatus diagrams, system diagrams, and flowcharts that relate to multiple groupings for group control messages, signals, or channel (e.g., Physical Downlink Control Channel (PDCCH)). The detailed description set forth below, in connection with the appended drawings and appendix, is intended as a description of various configurations and is not intended to limit the scope of the disclosure. Rather, the detailed description includes specific details for the purpose of providing a thorough understanding of the present disclosure. It will be apparent to those skilled in the art that these specific details are not required in every case and that, in some instances, well-known structures and components are shown in block diagram form for clarity of presentation.

This disclosure relates generally to multiple groupings for group control messages. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth, for example. For other various indoor wideband implementations, using a TDD over the unlicensed portion of the 5 GHz band, the subcarrier spacing may occur with 60 kHz over a 160 MHz bandwidth, for example. Finally, for various deployments transmitting with mmWave components at a TDD of 28 GHz, subcarrier spacing may occur with 120 kHz over a 500 MHz bandwidth, for example. Other deployments of different subcarrier spacing over different bandwidths are also within the scope of the present disclosure.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates an example of a wireless communications system 100 that supports multiple groupings for group PDCCH in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. Each access network entity may communicate with UEs 115 through a number of other access network transmission entities, which may be referred to as a radio head, a smart radio head, a remote radio head, or a transmission/reception point (TRP). The functions performed by base stations 105 may be carried out via these network entities (e.g., TRPs). Accordingly, as described herein, the terms TRP and base station may be used interchangeably unless otherwise noted.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. In some implementations, such as in factory automation settings and as used in certain examples herein, a UE 115 may also refer to a sensor/actuator (S/A) unit 115 that communicates with a programmable logic controller (PLC) that acts as a TRP 105 or base station 105.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). In some examples, base stations 105 or TRPs 105 may communicate with each other through backhaul links 134 to coordinate transmission and reception of signals with UEs 115 as part of a CoMP deployment. For example, a first TRP 105 may determine from UE 115 CSI reports that transmissions from a neighboring TRP 105 are negatively interfering with communications between the first TRP 105 and the UE 115. Accordingly, the first TRP 105 may inform the neighboring TRP 105 via backhaul links 134 of the interference or request that the neighboring TRP 105 mute transmissions on certain resources or transmit on different resources.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency spectrum band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be referred to as spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple use antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

According to various aspects of the present disclosure, a base station 105 may use SPS scheduling for a first transmission to a UE 115, but may use dynamic scheduling for retransmissions based on the HARQ feedback received from the UE 115. In some instances, a group resource allocation is transmitted to multiple UEs 115 based on the HARQ feedback received from the multiple UEs 115, such that the multiple UEs 115 may each receive the group resource allocation and determine its retransmission resource allocation from the group resource allocation, instead of receiving an individual resource allocation or grant.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (Tf=307200*Ts). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols and in some instances, a symbol of a mini-slot or a mini-slot may be the smallest unit of scheduling. Each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one subcarrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs that can support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As depicted in FIG. 1, a UE 115 may communicate over wireless communication links 125 with a particular serving TRP 105. In some instances, such as in factory automation environments, a large number of UEs 115 are served by TRPs 105, so a TRP 105 may schedule retransmission resources using a group resource allocation transmission instead of sending individual resource allocation transmissions to each UE 115, which may result in fewer overhead signaling messages. In some instances, however, the large number of UEs 115 may operate under a wide range of channel conditions, resulting in operational inefficiencies if a single group resource allocation transmission is sent to all the UEs 115. Accordingly, as described in further detail herein, the TRPs 105 may further divide the multiple UEs 115 into groups based on characteristics of the UEs 115 such as aggregation level or MCS required by the UEs 115. In this way, group resource allocation transmissions can be sent to UEs 115 operating under similar channel conditions to maximize the resources required for those transmissions. Other procedures are also described herein for multiple groupings for group Physical Downlink Control Channel (PDCCH).

Figure 2:
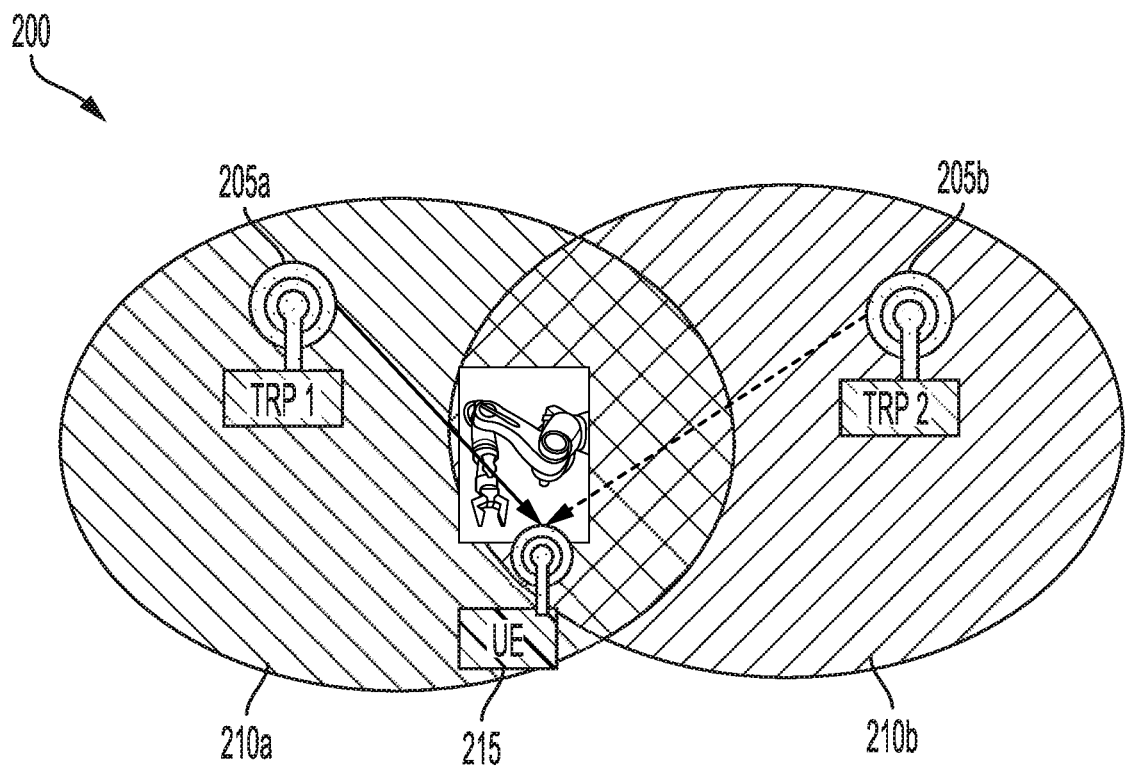
FIG. 2 illustrates an example system in which factory units communicate in accordance with aspects of the present disclosure.

FIG. 2 illustrates an example wireless communication system 200 in which factory units communicate using CoMP, in accordance with various aspects of the present disclosure. As seen in FIG. 2, a UE 215 may be a S/A unit and within range of both base station 205a and 205b. base station 205a may be associated with geographical coverage area 210a, while base station 205b may be associated with geographical coverage area 210b. In the illustrated example, the UE 215 may be physically closer to base station 205a but still within the coverage area of both base station 205a and base station 205b. By way of example only, the UE 215 may be associated with sensor/actuator (S/A) of an associated piece of equipment in the geographical coverage area 210a, such as a zone within a factory automation setting. In some examples, the UE 215 may perform wireless communications with each other and/or with the base station 205 which may be an example of a programmable logic controller (PLC) in a factory automation setting. In some aspects, the wireless communications may be SPS based communications that support defined latency and/or reliability requirements. Thus, base station 205 may perform communications with one or more of UEs 215. In some aspects, the SPS communications may be between one or more of the UEs. For example, some of the UEs 215 may be configured as S/As that perform various function within the factory automation setting, and base station 205 may be configured as a PLC that oversees and/or manages aspects of one or more S/As. In one non-limiting example, a factory automation setting may include hundreds or even thousands of UEs within a zone 210a. In some aspects, the UEs within the zone 210a may be considered a set of UEs that base station 205 is performing SPS communications with.

In some aspects, base station 205 may configure the UE 215 and other UEs within zone 210a for SPS communications. For example, base station 205 may use RRC signaling to provide an indication of the pre-configured SPS resources to be used for the SPS communications between one or more of the UEs and base station 215 and/or inter-communications between the UEs. Base station 205 may activate/deactivate the preconfigured SPS resources for one or more UEs for a particular subframe by including a trigger in the DCI of the subframe. For example, the base station 205 may transmit a DCI in a PDCCH control signal, and each UE may attempt to decode the PDCCH by unscrambling a cyclic redundancy check (CRC) using a SPS cell radio network temporary identifier (SPS C-RNTI). Broadly, wireless communication system 200 illustrates one example of an environment where SPS protocols are for URLLC communications, such as in factory automation settings.

In an example indoor factory environment, various objects may interrupt the path of the communication links between the UE 215 and base stations 205, while multiple base stations within the vicinity, including those not shown, may interfere with each other. Accordingly, the UE 215 may transmit HARQ feedback, such as an acknowledgement (ACK) or negative acknowledgement (NACK) to the base station 205 to indicate whether a particular scheduled transmission was accurately received. For example, the base station 205 may use SPS to schedule an initial transmission. If the UE 215 failed to correctly receive the initial transmission, it transmits a NACK response to the base station 205. If the UE 215 successfully received the initial transmission, it transmits an ACK response to the base station 205. The base station 205 may then dynamically schedule retransmissions using a resource allocation transmission in PDCCH if the UE 215 did not correctly receive the original transmission.

In some instances, the base station 205 may serve a large number of UEs 215. Accordingly, instead of scheduling retransmission resources for each of the UEs 215 separately, the base station 205 may send a group downlink control message to be decoded by the UEs 215 to determine their respective assigned resources for retransmissions. The UEs 215 in a group served by the base station 205 may receive the group downlink control message and use the information associated with the downlink resource configuration to identify which downlink resource configuration will be used for retransmission of the UE's respective SPS message. For example, each UE may use the information associated with the downlink resource configuration in combination with one or more rules to identify the resources assigned for the retransmission and associated downlink resource configuration. In some aspects, the downlink resource configuration may include some, all, or none of the downlink resource configuration that was used for transmission of the original SPS message. In some aspects, the group downlink control message may be transmitted in a group common PDCCH (GC-PDCCH), or some other similar group control signal.

One issue with transmission of a group control signal, however, is if the UEs receiving the group control signal are operating under a wide range of different channel conditions, especially in instances where the group control signal is intended for a large number of UEs. For example, to ensure that each UE receiving the group control signal can accurately decode the resource allocation, a base station may need to transmit the group resource allocation with modulation or repetition level suitable for the UE operating under the poorest channel conditions. This may result in using more resources than necessary for transmission of the group control signal for the UEs operating under more favorable channel conditions. According to various aspects of the present disclosure, the base station 205 may divide the UEs 215 into groups based on particular characteristics, such as aggregation level or modulation and coding scheme (MCS) requirements, as determined by feedback reports received from the UEs, such as channel state information (CSI) reports. With the UEs 215 divided into groups, the base station 205 may further divide the group control signal into smaller group messages to transmit to each group of UEs. Since the UEs are grouped based on their characteristics, the base station 205 may transmit the group control signals according to appropriate transmission reliability mechanisms, such as using appropriate aggregation level or MCS as required by the UEs in the particular group. The transmission of group resource allocations according to characteristics of the receiving UEs may reduce overhead and improve operational efficiency for dynamic resource scheduling, such as for retransmission resource allocation. The base station 205 may then retransmit the respective SPS messages to the UEs and according to each UEs corresponding downlink resource configuration.

Thus, aspects of the present disclosure provide for, instead of sending separate individual PDCCH to each UE (e.g., S/A), a group PDCCH is sent (e.g., the group downlink control message). In some examples, a single CRC may be attached to the group PDCCH (which may reduce the control overhead). In some aspects, even the group PDCCH payload itself may be significantly reduced as compared to separate PDCCHs for each UE. For instance, the group PDCCH may include a bitmap of which UEs sent ACKs and NACKs. This may be sufficient information for UEs to determine which resources are assigned if there is a predefined mapping from the UE position in the bitmap to resource allocation. Furthermore, base stations may send group resource allocation transmission according to characteristics of different groups of UEs, such as aggregation level or modulation and coding scheme (MCS) requirements. The group PDCCH message to a particular group may include information for a UE to decode intra-group resource allocation as well as inter-group resource allocation. Since UEs within a particular group have similar aggregation level or MCS requirements, the group PDCCH message for the group may be transmitted to maximize resource usage while ensuring successful decoding by the UEs in the group.

Figure 3:
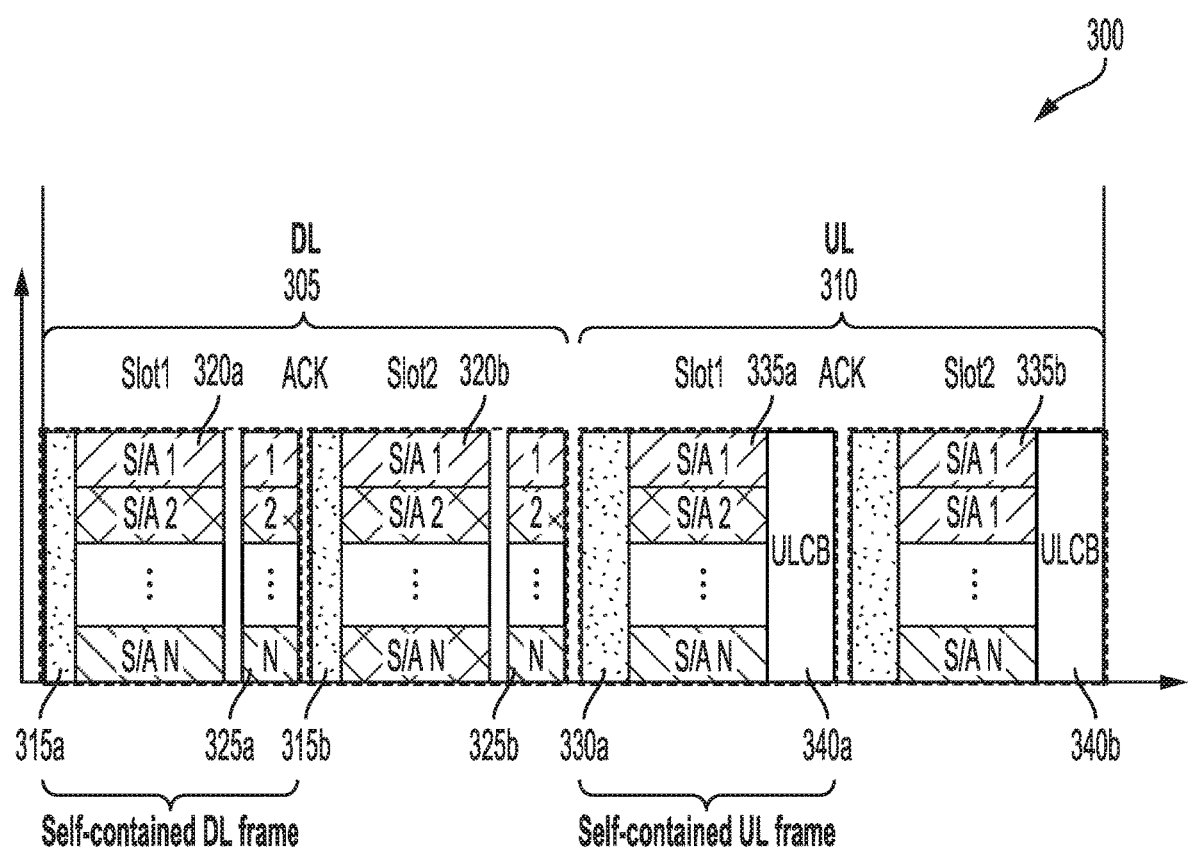
FIG. 3 illustrates an example of a frame structure that supports multiple groupings for group control signal in accordance with various aspects of the present disclosure.

FIG. 3 illustrates an example of a frame structure 300 that supports group common control channel and multiple groupings for group control signal in wireless communications in accordance with various aspects of the present disclosure. In some examples, frame structure 300 may implement aspects of wireless communication system 100 or 200. Frame structure 300 illustrates an example of a downlink frame configuration 305 and uplink frame configuration 310. The downlink frame configuration 305 generally includes two self-contained downlink frames. Each self-contained downlink frame may include a control portion 315 (e.g., PDCCH control signal), a downlink resource configuration 320, and a corresponding ACK/NACK resource 325. The control portion 315 may carry or otherwise provide an indication of a downlink SPS trigger for UEs within a set of UEs. The SPS trigger may activate the downlink resource configuration 320 for the respective UEs in the set of UEs (e.g., UE 1 through UE N). As will be discussed in more detail below, in some cases the downlink resource configuration 320 may allocate resources for UEs to receive retransmissions of prior SPS transmissions. Thus, UE 1 may have a downlink resource configuration that includes time/frequency resources for transmission of a downlink SPS message. UE 1 may respond to the SPS message by transmitting an ACK message or a NACK message, depending on whether UE 1 receives and/or decodes the SPS message, using the corresponding ACK/NACK resource 325. Other UEs may be assigned different time/frequency resources. Generally, the same procedure is repeated for the second self-contained downlink frame (e.g. slot 2), although some differences may include the use of a group common control message identifying resources to be used for retransmission of the SPS messages to UEs that transmitted NACK messages, as described below.

Uplink frame configuration 310 in this example includes two self-contained uplink frames. Each self-contained uplink frame may include a control portion 330 (e.g., PDCCH control signal), an uplink resource configuration 335 in which different UEs may be allocated different resources, and an uplink control block (ULCB) 340. Generally, the control portion 330 may carry or otherwise provided an indication of an uplink SPS trigger for UEs within a set of UEs. The uplink SPS trigger may activate the uplink resource configuration 335 for the respective UEs in the set of UEs (e.g., UE 1 through UE N). Thus, UE 1 may have an uplink resource configuration that includes time/ frequency resources used for transmission of an uplink SPS message. UE 1 may receive a response to the uplink SPS message via an ACK message or a NACK message, depending on whether the base station receives and/or decodes the uplink SPS message, using the control portion 330 in the next self-contained uplink frame. ULCB 340 may provide various uplink control signals, parameters, etc., and, in some examples, may include one or more guard periods to allow for transmission from uplink-to-downlink at one or more of the wireless devices. Generally, the same procedure is repeated for the second self-contained downlink frame (e.g. slot 2).

In some examples, one for more of the uplink SPS messages and/or downlink SPS messages may not be received and/or decoded by the respective receiving device. Accordingly, frame structure 300 may utilize aspects of the described techniques to provide a group downlink control message to convey an indication of retransmission resources. In a downlink example, the control portion 315 may carry a group downlink control message that includes information associated with a downlink resource configuration 320 for retransmission of respective SPS messages to a subset of UEs. For example, during the first self-contained downlink frame the SPS messages transmitted during slot 1 may be received by some UEs, but not by all of the UEs. Accordingly, those UEs may respond by transmitting a NACK message and the corresponding ACK/NACK resource 325-a to the base station. The UEs transmitting the NACK messages may form a subset of UEs. The base station may respond by transmitting a group downlink control message and the control portion 315-b of the second self-contained downlink frame. In some instances, the base station may transmit the group downlink control message to a subset of UEs in a particular group based on characteristics of the UEs, such as aggregation level or MCS requirement, which may be based on channel conditions of the UEs. The group downlink control message may include information associated with downlink resource configuration 320-b for retransmission of the respective SPS messages to the subset of UEs. The UEs in the subset of UEs may identify their respective downlink resource configuration 320-b based on the information included in the group downlink control message, e.g., access to a lookup table or other reconfiguration rule that ties the information included in the group downlink control message with the corresponding downlink resource configuration 320-b. In some cases, a retransmission may be transmitted to a UE on certain resources, and the downlink control message may provide information that may be used to determine the downlink resource configuration 320-b for each UE. Accordingly, the base station may retransmit the SPS messages to each UE in the subset of UEs using the downlink resource configuration 320-b, which may include retransmitting one or more SPS messages via different resources than used in downlink resource configuration 320-a.

Figure 4:
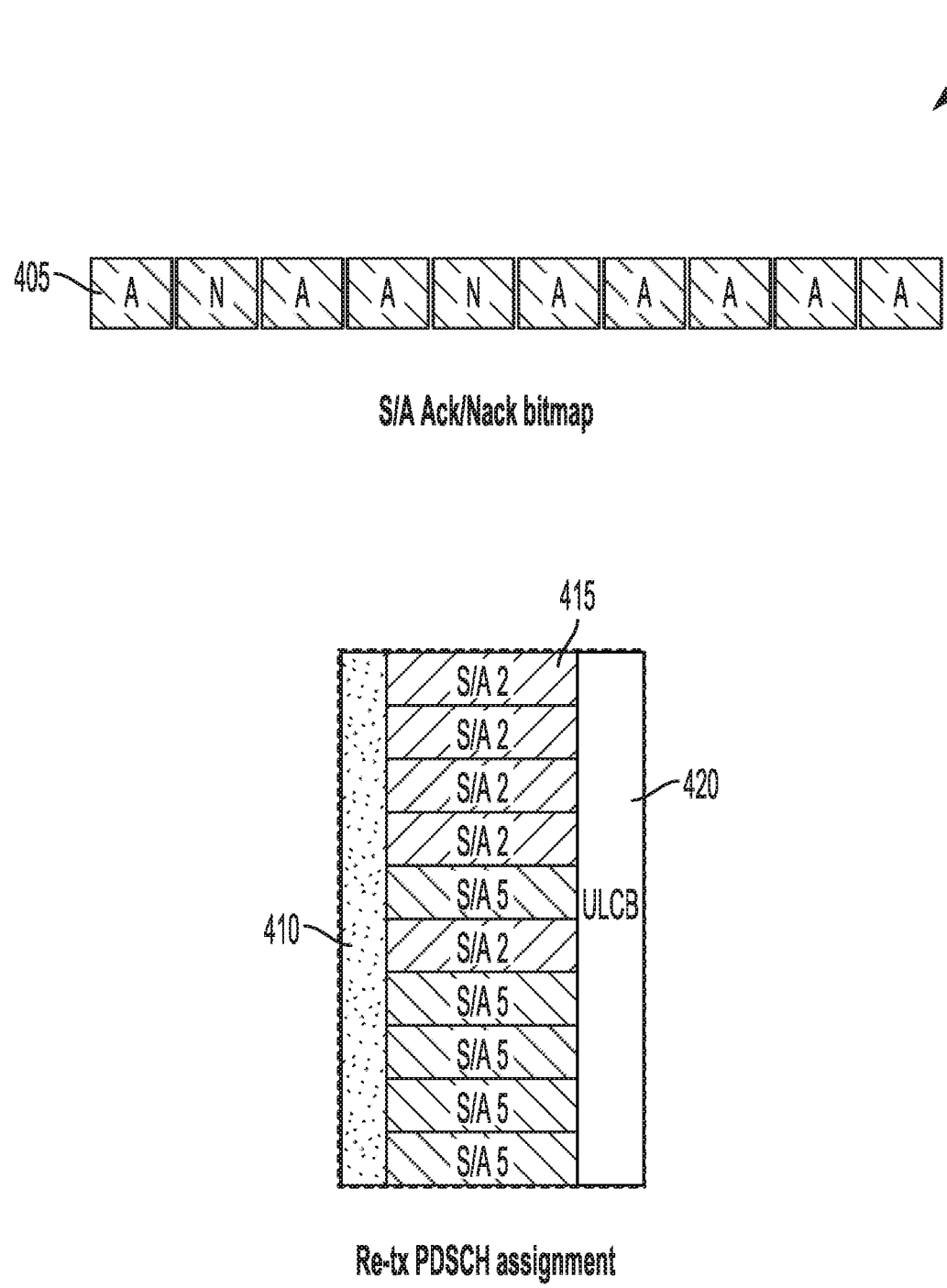
FIGS. 4-7 illustrate examples of retransmission resource assignment that supports group common control channel and multiple groupings for group control signal in accordance with various aspects of the present disclosure.

FIG. 4 illustrates an example of retransmission resources 400 that supports group common control channel and multiple groupings for group control signal in wireless communications in accordance with various aspects of the present disclosure. In some examples, retransmission resources 400 may be implemented by aspects of wireless communication system 100 or 200.

In this example, retransmission resources 400 have an ACK/NACK bitmap that may be indicated in a group downlink control message. For example, a base station may transmit SPS messages to (or receive SPS messages from) a set of UEs using respective resources corresponding to each UE. In a downlink situation, the base station may receive individual ACK messages or NACK messages from the UEs in the set of UEs responsive to the SPS messages. In an uplink situation, the base station may provide an indication of ACK/NACK to the set of UEs. An ACK message provides an indication that a UE (in the downlink scenario) or the base station (in an uplink scenario) received and successfully decoded its SPS message. Correspondingly, a NACK message provides an indication that the SPS message was not received and/or was not able to be successfully decoded. The base station may respond by transmitting a group downlink control message to the UEs in the set of UEs. In one example, the group downlink control message may include information associated with downlink resource configuration for retransmission of the respective SPS messages. For example, the base station may transmit the ACK/NACK bitmap of retransmission resource 400 that provides the indication of the information associated with the downlink resource configurations.

In some aspects, the ACK/NACK bitmap includes a plurality of bits 405, where each bit 405 corresponds to a particular UE in the set of UEs. Thus, the first bit may correspond to a first UE having an index of 1, the second bit may correspond to UE 2, and so forth. Generally, the presence or absence of a bit, or whether a bit is set or not set (e.g., 1 or 0 respectively), for the respective UE may be based on whether the base station received an ACK message or a NACK message from that UE (in the downlink scenario) or of whether the base station was able to receive and decode the SPS messages received from UEs (in an uplink scenario). Thus, in the example ACK/NACK bitmap indicates that the base station received ACK messages from UEs 1, 3, 4, 6-10 and received NACK messages from UEs 2 and 5 (in a downlink scenario) or that the base station is providing an ACK indication to UEs 1, 3, 4, 6-10 and providing a NACK indication to UEs 2 and 5 (in an uplink scenario).

In some aspects, the base station and UEs in the set of UEs may be configured with one or more sets of rules to be applied to the information included in the group downlink control message (e.g., to the ACK/NACK bitmap) in determining the downlink resource configuration to be used for retransmission of the SPS messages. Generally, the rules may provide an indication of how available resources (including resources that corresponded to SPS messages for which ACK messages were received) may be divided among the UEs in the subset of UEs, e.g., evenly divided, based on the resource block count for each UE in the subset of UEs, etc. In some examples, available resources are divided evenly among UEs that require retransmissions. In the illustrated example, if UE 2 and UE 5 are the only UEs requiring retransmission, a predefined rule may define even distribution of resources, so an available 10 resource units (e.g., resource blocks) are divided evenly between UE 2 and UE 5. Further, a rule may define which specific resource units will be allocated respectively to UE 2 and UE 5. In one example, UE 2 and UE 5 may be allocated whichever resource unit they were allocated for the initial SPS transmission, while any additional resources are allocated sequentially based on the UE index. As seen in FIG. 4, UE 2 would be allocated the second resource block based on its UE index of 2, and UE 5 would be allocated the fifth resource block based on its UE index of 5. The additional resource blocks are then allocated sequentially, first to UE 2 and then to UE 5. In the illustrated example, UE 2 would then be allocated resources 1-4, and 6, while UE 5 would be allocated resources 5 and 7-10.

Accordingly, the group downlink control message may include information on how resources are allocated for retransmissions. In one example, this may include a set of available downlink resource configurations to be applied to the information included in the group downlink control message. In some aspects, this may include one or more preconfigured tables that can be used with the information included in the group downlink control message to determine the downlink resource configuration. In some examples, the group control message may include additional information as needed for the UE to determine its resources, such as information regarding remaining resources if resources are not evenly divided among UEs within a group.

In some instances, the UEs receiving a group downlink control message may have different characteristics. In particular, the UEs may operate under different channel conditions, such as different pathloss or interference conditions. Accordingly, different UEs may require different aggregation levels for receiving downlink control information (DCI) in PDCCH or different MCS for receiving PDSCH. If there is a wide range of different requirements among the UEs receiving a group downlink control message, the aggregation level of the UE with the worst channel conditions would need to be used for the entire group downlink control message to ensure that the UEs in the group can all decode the message properly. According to various aspects of the present disclosure, the UEs may be grouped into multiple groupings based on their characteristics or requirements for receiving the group downlink control message. Examples of UE requirements used for multiple groupings may include aggregation level or MCS, which both may depend on the pathloss experienced at the UEs. The UEs having the same or similar aggregation level or MCS requirements may be grouped together. A base station may then send a group downlink control message tailored for each group using the aggregation level or MCS most suited for UEs within that group.

Figure 5:
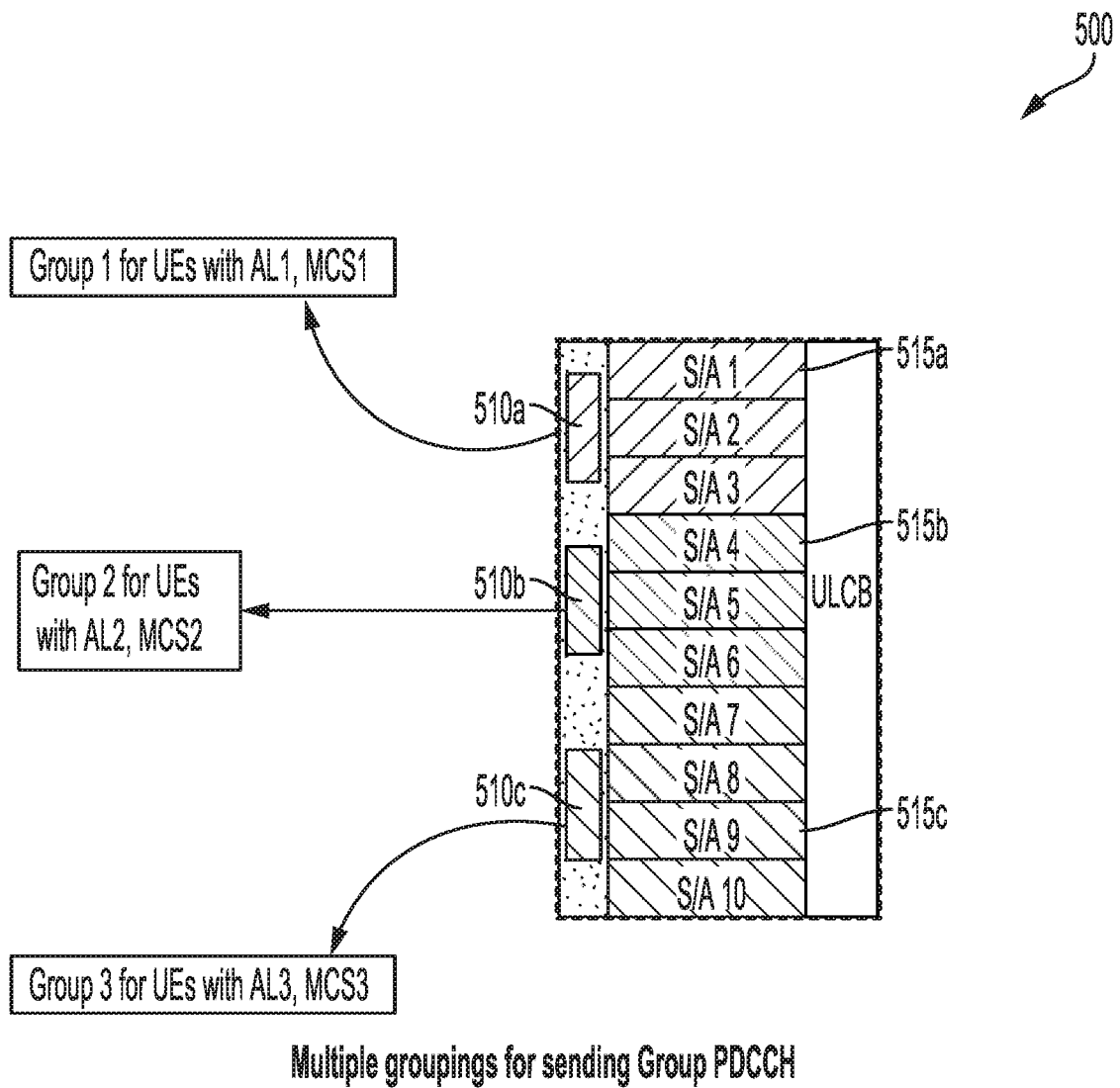

FIG. 5 illustrates an example of retransmission resources 500 that supports group common control channel and multiple groupings for group control signal in wireless communications in accordance with various aspects of the present disclosure. In some examples, retransmission resources 500 may be implemented by aspects of wireless communication system 100 or 200.

As seen in FIG. 5, a base station may send a group downlink control message for each group of UEs served by the base station. In the illustrated example, a first group may comprise UEs 1-3, a second group may comprise UEs 4-6, and a third group may comprise UEs 7-10. The groups may be determined based on aggregation level or MCS requirements of UEs within each group. The first group may include UEs with a first aggregation level or MCS requirement, the second group may include UEs with a second aggregation level or MCS requirement, and the third group may include UEs with a third aggregation level or MCS requirement. The base station may determine the groupings based on feedback reports received from the UEs and may inform the UEs of the groupings through various forms of signaling, such as RRC signaling and the like. In some aspects, the base station may send a separate group downlink control message for each of the groups, instead of a single group downlink control message for UEs 1-10.

Figure 6:
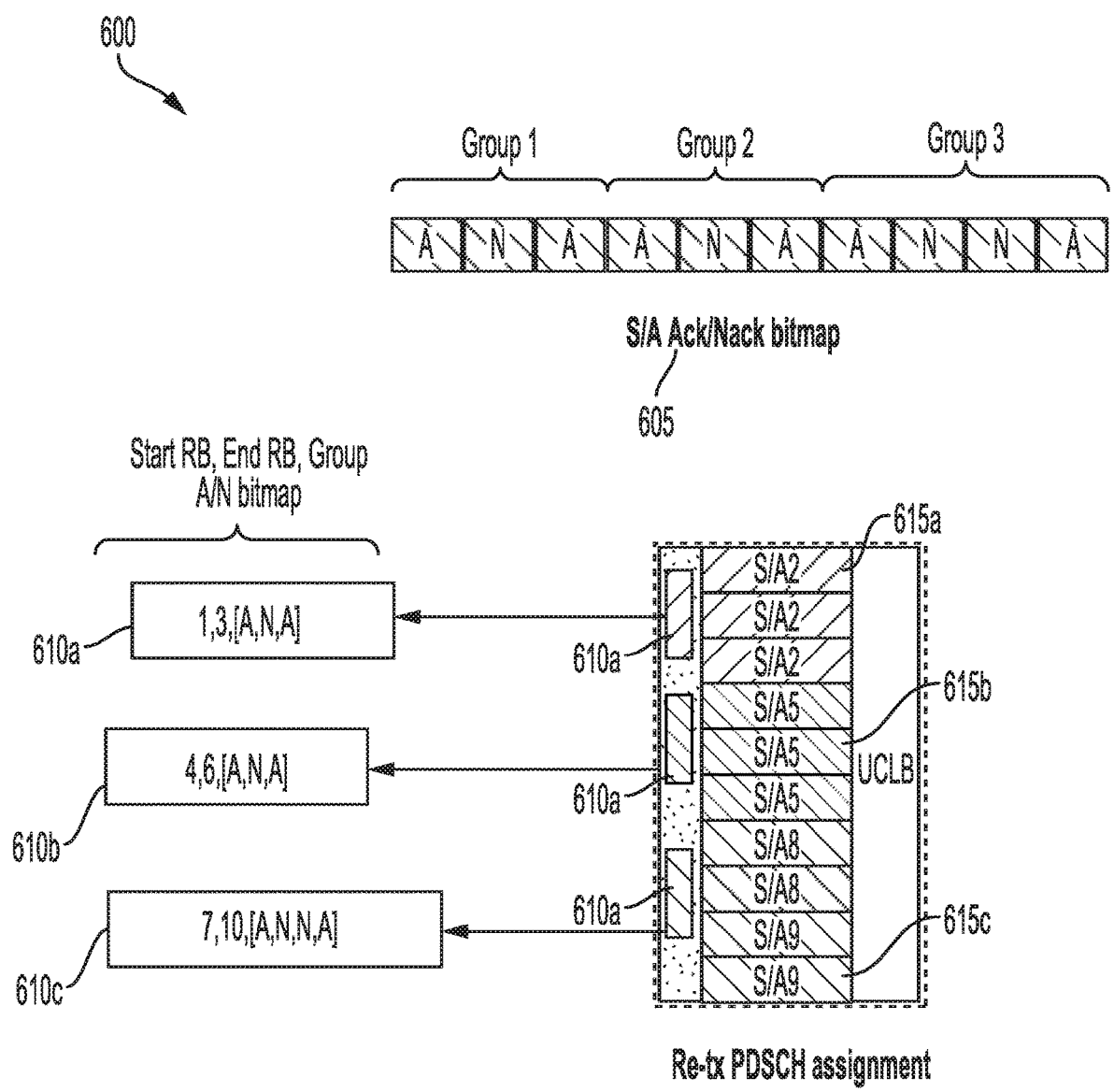

FIG. 6 illustrates an example of retransmission resources 600 that support group common control channel and multiple groupings for group control signal in wireless communications in accordance with various aspects of the present disclosure. In some examples, retransmission resources 600 may be implemented by aspects of wireless communication system 100 or 200.

A base station may send a group downlink control message for each group of UEs served by the base station. The group downlink control message may contain information that allows a UE to determine which resources out of the available resources are allocated for its retransmissions, and by extension, which resources are allocated for other UEs. In some instances, a base station may serve ten UEs, and the base station may further divide the ten UEs into three groups based on characteristics of the UEs. For example, UEs having the highest aggregation level or MCS requirements may be grouped into a first group, and similarly, the second and third groups having UEs with lower aggregation level or MCS requirements respectively. Further, the base station may identify each UE with an index based in part on which group the UEs belong to. In the illustrated example, the UEs may be indexed 1-10, and group 1 may comprise UEs 1-3, group 2 may comprise UEs 4-6, and group 3 may comprise UEs 7-10.

In some instances, a base station may first schedule an initial SPS transmission for the ten UEs, as described above with reference to FIG. 3. The UEs may then send ACK/NACK feedback to the base station based on whether the UEs correctly received the scheduled SPS transmission. From the perspective of the base station, the ACK/NACK feedback reports may comprise a logical bitmap 605 as depicted in FIG. 6. If the base station transmits a single group downlink control message to be decoded by all ten UEs, the logical bitmap 605 may contain sufficient information to inform the UEs which ones require retransmissions (based on a NACK feedback) and which resources are allocated to each UE requiring a retransmission (e.g., based on a predefined mapping). In the present example, however, the base station may transmit a separate group downlink control message to each of groups 1-3 to maximize resources in view of the different characteristics associated with each group. Accordingly, the base station may generate the group downlink control messages 610*a-c* for each group such that sufficient information is included for the receiving UEs to determine appropriate retransmission resources.

In view of a common set of resources to be shared among multiple groups of UEs, the base station may include information that allows UEs to determine both intra-group resource allocation and inter-group resource allocation. In other words, a UE needs to determine how resources are allocated among UEs within its own group as well as how resources are allocated for its group in relation to other groups. Turning to the illustrated example, a group downlink control message 610 may include a portion for intra-group resource allocation and a portion for inter-group resource allocation. In some instances, the group downlink control message 610 may include a starting and ending resource block index for consecutive resource blocks that are assigned to a particular group. It should be noted that the consecutive resource blocks may represent physically consecutive resource blocks or logically consecutive resource blocks. For example, although depicted as consecutive resource blocks, the depiction may represent logically consecutive resource blocks, while actual physical resource blocks may be dispersed in location, such as in a comb arrangement or other structure.

As seen in FIG. 6, group downlink control message 610*a* for group 1 includes resource block indexes 1 and 3, indicating group 1 is assigned resource blocks 1-3. Group downlink control message 610*b* intended for group 2 includes resource block indexes 4 and 6, indicating group 2 is assigned resource blocks 4-6. Similarly, group downlink control message 610*c* intended for group 3 includes resource indexes 7 and 10, indicating group 3 is assigned resource blocks 7-10. For the intra-group resource allocation portion, the base station may include a group ACK/NACK bitmap, showing which UEs within the group transmitted a NACK feedback and require retransmission. There may be predefined rules or mapping that define how the group resources are divided among UEs within the group that require retransmission. For example, a predefined rule may dictate that resources are divided evenly among UEs within a group that require retransmission, but other rules are within the scope of the present disclosure. Accordingly, each UE within a group may first determine which resources are allocated to the group based on the resource block indexes indicated in the group downlink control message and then determine which of the resources allocated to the group are allocated to a particular UE in the group.

Continuing with the illustrated example, UEs from group 1 receive a group downlink control message 610*a*, showing that resources 1-3 are allocated for group 1 retransmissions. The UEs in group 1 further determine from the group downlink control message 610*a* that a single UE from group 1, UE 2, reported a NACK, so UE 2 is the only UE in group 1 that is allocated resources 1-3. UEs from group 2 receive a group downlink control message 610*b*, showing that resources 4-6 are allocated for group 2 retransmissions. The UEs in group 2 further determine from the group downlink control message 610*b* that a single UE from group 2, UE 5, reported a NACK, so UE 5 is the only UE in group 2 that is allocated resources 4-6. UEs from group 3 receive a group downlink control message 610*c*, showing that resources 7-10 are allocated for group 3 retransmissions. The UEs in group 3 further determine from the group downlink control message 610*c* that two UEs from group 2, UEs 8 and 9, reported a NACK, so the allocated resources 7-10 are divided between UEs 8 and 9. In some instances, a predefined rule may indicate that the resources are divided evenly among UEs in the group that require retransmission, so UEs 8 and 9 share the four resources evenly. Other types of predefined rules, such as rules indicating resource allocation based at least in part on resources allocated for an initial SPS transmission, are also within the scope of the present disclosure. Further, the UEs in groups 1, 2 and 3 monitor for their group downlink control message based on which group the UE belongs to.

As described above, a base station may send a group downlink control message for each group of UEs. The base station may include sufficient information for the UEs in each group to determine resources allocated for retransmissions. For example, the base station may include both intra-group and inter-group resource mapping information. Although described using examples as depicted in FIG. 6, other methods of including sufficient information are also within the scope of the present disclosure. For example, in some instances, a base station may include a starting resource block index and a number of resource blocks for each UE in the group that requires a retransmission, instead of a starting and ending resource block index. The UEs in the group may then determine which resource block is a starting resource block and how many resource blocks are assigned to each UE in the group.

Figure 7:
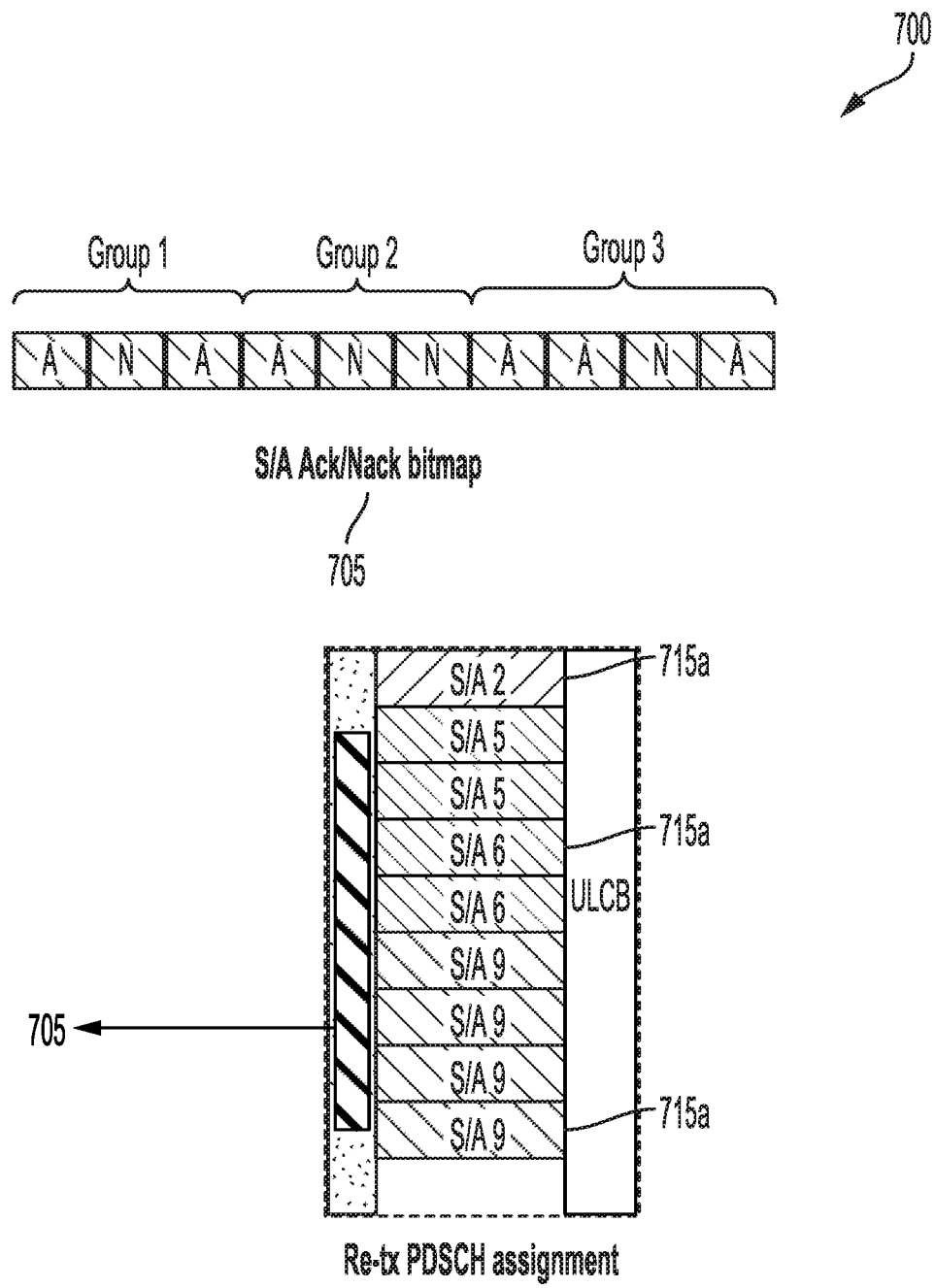

FIG. 7 illustrates an example of retransmission resources 700 that support group common control channel and multiple groupings for group control signal in wireless communications in accordance with various aspects of the present disclosure. In some examples, retransmission resources 700 may be implemented by aspects of wireless communication system 100 or 200.

In some instances, other forms of resource allocation for multiple UEs in a group downlink control message may be used to accommodate UEs having different characteristics, such operation under different channel conditions as determined by pathloss, for example. FIG. 7 illustrates an example resource allocation in which a single group downlink control message is sent by a base station. The single group downlink control message may be intended for UEs in multiple or all groups served by the base station. The mapping of the resources may be based on the groupings according to predefined or preconfigured rules.

As seen in FIG. 7, for example, a base station may receive ACK/NACK feedback reports from ten UEs. The base station may have grouped the UEs into three groups based on characteristics of the UEs. The base station may further convey the group structure to the UEs using various forms of signaling, such as radio resource control (RRC) configuration signaling, for example. In the present example, group 1 may include UEs 1-3, group 2 may include UEs 4-6, and group 3 may include UEs 7-10. In some instances, the group that a UE belongs to may indicate what resources are allocated for UEs of the group, according to a predefined rule. In certain instances, the base station may convey the predefined rule according to prior signaling, such as RRC configuration signaling. For example, the predefined rule may indicate that UEs belonging to group 1 that require retransmission are each allocated one resource block, UEs belonging to group 2 that require retransmission are each allocated two resource blocks, and UEs belonging to group 4 that require retransmissions are each allocated four resource blocks.

In this scenario, the base station may transmit a single group downlink control message in the format of the ACK/NACK bitmap 705 indicating which UEs require retransmission due to a NACK feedback received at the base station. In conjunction with the predefined rule, the UEs receiving the ACK/NACK bitmap 705 may be able to determine which resources 715 are allocated to which UEs for retransmissions. In the illustrated example, UE 2 is the only UE from group 1 requiring retransmission, so UE 2 receives the retransmission on the one resource block allocated to group 1. UEs 5 and 6 from group 2 require retransmission, so UEs 5 and 6 are allocated two resource blocks each, per the predefined rule. In group 3, UE 9 is the only UE requiring retransmission, so UE 9 is allocated four resource blocks, since the predefined rule indicates that UEs in group 3 requiring retransmission are each allocated four resource blocks. In this way and as illustrated in the present example, a base station may inform UEs from different groups, in a single group downlink control message, regarding which resources are allocated to each UE.

Figure 8:
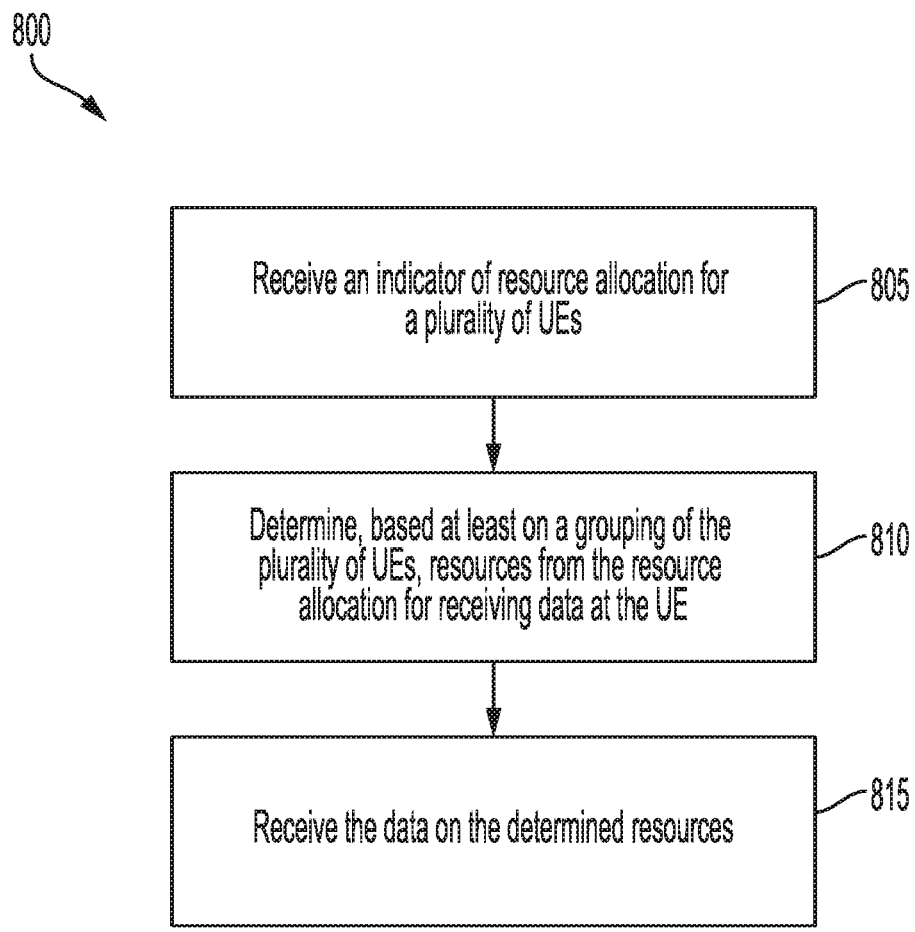
FIGS. 8-9 illustrate methods for multiple groupings for group control siganl in accordance with aspects of the present disclosure.

FIG. 8 shows a flowchart illustrating a process 800 performed by a user equipment (UE) for multiple groupings for group downlink control message in accordance with various aspects of the present disclosure. The operations of process 800 may be implemented by a UE or its components, as described with reference to FIGS. 1 and 10. For example, the operations of process 800 may be performed by the processor 1080, either alone or in combination with other components, as described herein. In some examples, the UE 115 may execute a set of codes to control the functional elements of the device to perform the functions described below. Additionally or alternatively, the UE 115 may perform aspects of the functions described below using special-purpose hardware.

At 805, the UE 115 receives an indicator of resource allocation for a plurality of UEs. The indicator of resource allocation may comprise a group downlink control message that provides sufficient information for the UE 115 to determine which resources are allocated for reception of an upcoming transmission, such as a retransmission of a prior missed transmission. In some instances, the indicator of resource allocation includes a bitmap indicating which UEs in the plurality of UEs reported a negative acknowledgement for a prior transmission, or a group Physical Downlink Control Channel (PDCCH) for allocating resources for a particular group of the grouping. In some instances, the indicator of resource allocation includes a bitmap indicating which UEs in the particular group reported a negative acknowledgement for a prior transmission, and additionally or alternatively, a starting and ending resource index for resources assigned to the particular group. In other instances, the indicator of resource allocation includes a starting resource index and a number of resources allocated to each UE within the particular group that reported a negative acknowledgement for a prior transmission.

At 810, the UE 115 determines, based at least on a grouping of the plurality of UEs, resources from the resource allocation for receiving data at the UE. In some instances, the grouping is based at least in part on a characteristic of the UEs, such as a pathloss associated with the UEs. In certain instances, the determining resources comprises determining a number of resource blocks associated with a group of the grouping to which the UE belongs and identifying a location of the number of resource blocks based on a predefined mapping of resources for UEs within the group, and the number of resource blocks associated with the group is based on a modulation and coding scheme (MCS) or aggregation level associated with UEs in the group. In some instances, the determining resources comprises determining that resources assigned to the particular group are uniformly divided among each UE within the particular group that reported a negative acknowledgement for a prior transmission. At 815, the UE 115 receives the data on the determined resources.

Figure 9:
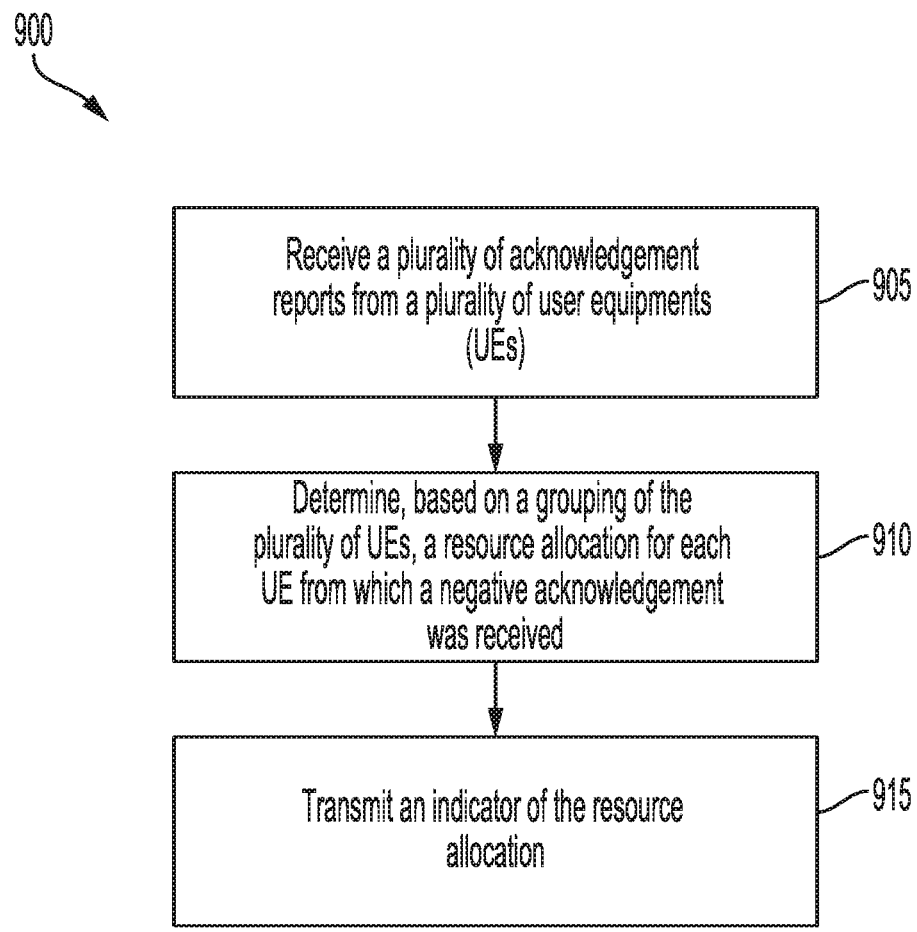

FIG. 9 shows a flowchart illustrating a process 900 performed by a base station for multiple groupings for group downlink control message in accordance with various aspects of the present disclosure. The operations of process 900 may be implemented by a base station or its components, as described with reference to FIGS. 1 and 10. For example, the operations of process 900 may be performed by the processor 1040, either alone or in combination with other components, as described herein. In some examples, the base station 105 may execute a set of codes to control the functional elements of the device to perform the functions described below. Additionally or alternatively, the base station 105 may perform aspects of the functions described below using special-purpose hardware.

At 905, the base station 105 receives a plurality of acknowledgement reports from a plurality of user equipments (UEs). At 910, the base station 105 determines, based on a grouping of the plurality of UEs, a resource allocation for each UE from which a negative acknowledgement was received. In some instances, the base station 105 determines the grouping based on at least one of channel conditions, aggregation level requirement, or modulation and coding scheme (MCS) for each UE in the plurality of UEs. Channel conditions may, for example, be indicated by pathloss associated with the UEs. In some instances, UEs with similar channel conditions, aggregation level requirement, or MCS are grouped into a same group. At 915, the base station 105 transmits an indicator of the resource allocation. In some instances, indicator of resource allocation includes a bitmap indicating which UEs in the plurality of UEs reported a negative acknowledgement for a prior transmission. The indicator of resource allocation may comprise a group downlink control message, such as a group PDCCH, for allocating resources for a particular group of the grouping. The base station 105 may transmit a separate group PDCCH for each group of the grouping. In some instances, the indicator of resource allocation includes a bitmap indicating which UEs in the particular group reported a negative acknowledgement for a prior transmission. The indicator of resource allocation may include a starting and ending resource index for resources assigned to the particular group, or may include a starting resource index and a number of resources allocated to each UE within the particular group that reported a negative acknowledgement for a prior transmission.

Figure 10:
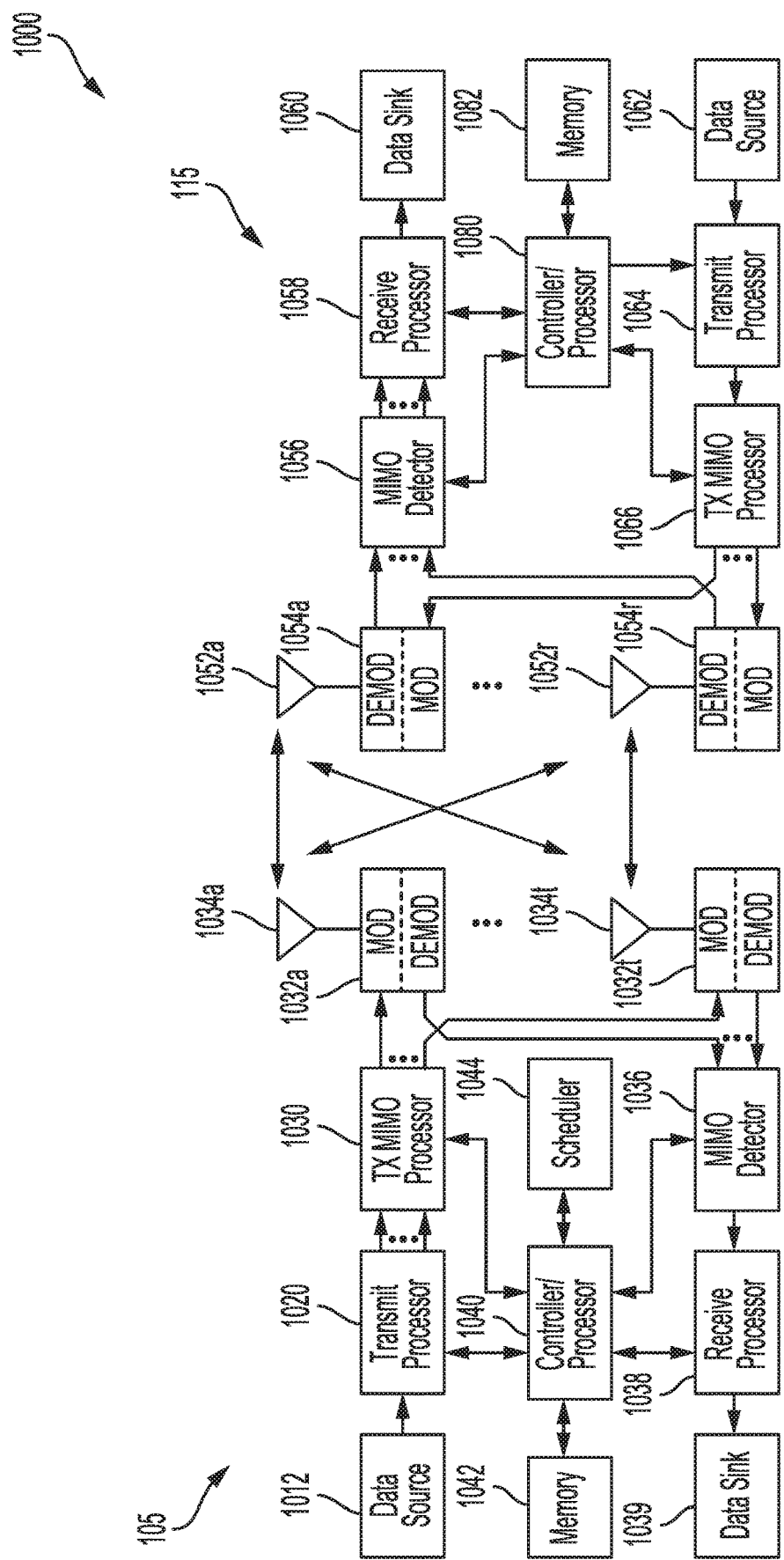
FIG. 10 is a block diagram illustrating a design of a base station/eNB/TRP and a UE configured according to one aspect of the present disclosure.

FIG. 10 shows a block diagram 1000 of a design of a base station/eNB 105 and a UE 115, which may be one of the base stations/eNBs and one of the UEs in FIG. 1. At the eNB 105, a transmit processor 1020 may receive data from a data source 1012 and control information from a controller/processor 1040. The control information may be for various control channels such as the PBCH, PCFICH, PHICH, PDCCH, EPDCCH, MPDCCH etc. The data may be for the PDSCH, etc. The transmit processor 1020 may process (e.g., encode and symbol map) the data and control information to obtain data symbols and control symbols, respectively. The transmit processor 1020 may also generate reference symbols, e.g., for the PSS, SSS, and cell-specific reference signal. A transmit (TX) multiple-input multiple-output (MIMO) processor 1030 may perform spatial processing (e.g., precoding) on the data symbols, the control symbols, and/or the reference symbols, if applicable, and may provide output symbol streams to the modulators (MODs) 1032a through 1032t. Each modulator 1032 may process a respective output symbol stream (e.g., for OFDM, etc.) to obtain an output sample stream. Each modulator 1032 may further process (e.g., convert to analog, amplify, filter, and upconvert) the output sample stream to obtain a downlink signal. Downlink signals from modulators 1032a through 1032t may be transmitted via the antennas 1034a through 1034t, respectively. The downlink signals may include references signals such as CSI-RS or synchronization signals, which may be used by the UE 115 to measure channel conditions for reporting to the base station 105. The base station 105 may then use the reporting feedback to determine how to group the UE 115 among other UEs for transmitting group downlink control messages, as described above with reference to FIGS. 6 and 7.

At the UE 115, the antennas 1052a through 1052r may receive the downlink signals from the eNB 105 and may provide received signals to the demodulators (DEMODs) 1054a through 1054r, respectively. Each demodulator 1054 may condition (e.g., filter, amplify, downconvert, and digitize) a respective received signal to obtain input samples. Each demodulator 1054 may further process the input samples (e.g., for OFDM, etc.) to obtain received symbols. A MIMO detector 1056 may obtain received symbols from all the demodulators 1054a through 1054r, perform MIMO detection on the received symbols if applicable, and provide detected symbols. A receive processor 1058 may process (e.g., demodulate, deinterleave, and decode) the detected symbols, provide decoded data for the UE 115 to a data sink 1060, and provide decoded control information to a controller/processor 1080.

On the uplink, at the UE 115, a transmit processor 1064 may receive and process data (e.g., for the PUSCH) from a data source 1062 and control information (e.g., for the PUCCH) from the controller/processor 1080. The transmit processor 1064 may also generate reference symbols for a reference signal. The symbols from the transmit processor 1064 may be precoded by a TX MIMO processor 1066 if applicable, further processed by the modulators 1054a through 1054r (e.g., for SC-FDM, etc.), and transmitted to the eNB 105. The transmissions to the eNB 105 may include channel measurement reports such as CSI reports, for example. At the eNB 105, the uplink signals from the UE 115 may be received by the antennas 1034, processed by the demodulators 1032, detected by a MIMO detector 1036 if applicable, and further processed by a receive processor 1038 to obtain decoded data and control information sent by the UE 115. The processor 1038 may provide the decoded data to a data sink 1039 and the decoded control information to the controller/processor 1040.

The controllers/processors 1040 and 1080 may direct the operation at the eNB 105 and the UE 115, respectively. The controller/processor 1040 and/or other processors and modules at the eNB 105 may perform or direct the execution of the functional blocks illustrated in FIG. 9, and/or other various processes for the techniques described herein. The controllers/processor 1080 and/or other processors and modules at the UE 115 may also perform or direct the execution of the functional blocks illustrated in FIG. 8, and/or other processes for the techniques described herein. The memories 1042 and 1082 may store data and program codes for the eNB 105 and the UE 115, respectively. For example, memory 1042 may store instructions that, when performed by the processor 1040 or other processors depicted in FIG. 10, cause the base station 105 to perform operations described with respect to FIG. 9. Similarly, memory 1082 may store instructions that, when performed by processor 1080 or other processors depicted in FIG. 10 cause the UE 115 to perform operations described with respect to FIG. 8. A scheduler 1044 may schedule UEs for data transmission on the downlink and/or uplink.

While blocks in FIG. 10 are illustrated as distinct components, the functions described above with respect to the blocks may be implemented in a single hardware, software, firmware, or combination component or in various combinations of components. For example, the functions described with respect to the transmit processor 1020, the receive processor 1038, or the TX MIMO processor 1030 may be performed by or under the control of processor 1040.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method performed by a user equipment (UE) for wireless communication, the method comprising: receiving an indicator of resource allocation for a plurality of UEs, wherein the indicator of resource allocation includes a bitmap indicating which UEs in the plurality of UEs reported a negative acknowledgement for a prior downlink transmission; determining, based at least on a grouping of the plurality of UEs, resources from the resource allocation for receiving data at the UE; and receiving the data on the determined resources.

2. The method of claim 1, wherein the determining resources comprises determining a number of resource blocks associated with a group of the grouping to which the UE belongs and identifying a location of the number of resource blocks based on a predefined mapping of resources for UEs within the group.

3. The method of claim 2, wherein the number of resource blocks associated with the group is based on a modulation and coding scheme (MCS) associated with UEs in the group.

4. The method of claim 1, wherein the indicator of resource allocation comprises a group Physical Downlink Control Channel (PDCCH) for allocating resources for a particular group of the grouping.

5. The method of claim 4, wherein the indicator of resource allocation includes a bitmap indicating which UEs in the particular group reported a negative acknowledgement for a prior downlink transmission.

6. The method of claim 5, wherein the indicator of resource allocation further includes a starting and ending resource index for resources assigned to the particular group.

7. The method of claim 6, wherein the determining resources comprises determining that resources assigned to the particular group are uniformly divided among each UE within the particular group that reported a negative acknowledgement for a prior downlink transmission.

8. The method of claim 5, wherein the indicator of resource allocation further includes a starting resource index and a number of resources allocated to each UE within the particular group that reported a negative acknowledgement for a prior downlink transmission.

9. The method of claim 4, further comprising monitoring for the group PDCCH based on the UE belonging to the particular group.

10. An apparatus for wireless communications, comprising: a processor; memory coupled-with the processor; and instructions stored in the memory and operable, when executed by the processor, to cause the apparatus to: receive an indicator of resource allocation for a plurality of UEs, wherein the indicator of resource allocation includes a bitmap indicating which UEs in the plurality of UEs reported a negative acknowledgement for a prior downlink transmission; determine, based at least on a grouping of the plurality of UEs, resources from the resource allocation for receiving data at the UE; and receive the data on the determined resources.

11. The apparatus of claim 10, wherein the data comprises a retransmission of a prior missed transmission.

12. The apparatus of claim 10, wherein the determining resources comprises determining a number of resource blocks associated with a group of the grouping to which the UE belongs and identifying a location of the number of resource blocks based on a predefined mapping of resources for UEs within the group.

13. The apparatus of claim 12, wherein the number of resource blocks associated with the group is based on a modulation and coding scheme (MCS) associated with UEs in the group.

14. The apparatus of claim 10, wherein the indicator of resource allocation comprises a group Physical Downlink Control Channel (PDCCH) for allocating resources for a particular group of the grouping.

15. The apparatus of claim 14, wherein the indicator of resource allocation includes a bitmap indicating which UEs in the particular group reported a negative acknowledgement for a prior downlink transmission.

16. The apparatus of claim 15, wherein the indicator of resource allocation further includes a starting and ending resource index for resources assigned to the particular group.

17. The apparatus of claim 14, wherein the determining resources comprises determining that resources assigned to the particular group are uniformly divided among each UE within the particular group that reported a negative acknowledgement for a prior downlink transmission.

18. The apparatus of claim 15, wherein the indicator of resource allocation further includes a starting resource index and a number of resources allocated to each UE within the particular group that reported a negative acknowledgement for a prior downlink transmission.

19. The apparatus of claim 14, wherein the instructions are further operable to cause the apparatus to monitor for the group PDCCH based on the UE belonging to the particular group.

20. The apparatus of claim 10, wherein the grouping is based at least in part on a pathloss associated with each of the plurality of UEs.

21. A method for wireless communication, comprising: receiving a plurality of acknowledgement reports from a plurality of user equipments (UEs), the plurality of acknowledgement reports acknowledging whether a downlink transmission was received by UEs in the plurality of UEs; determining, based on a grouping of the plurality of UEs, a resource allocation for each UE in the plurality of UEs from which a negative acknowledgement was received; and transmitting an indicator of the resource allocation, wherein the indicator of the resource allocation includes a bitmap indicating which UEs in the plurality of UEs reported a negative acknowledgement for a prior downlink transmission.

22. The method of claim 21, further comprising determining the grouping based on at least one of channel conditions, aggregation level requirement, or modulation and coding scheme (MCS) for each UE in the plurality of UEs.

23. The method of claim 22, wherein UEs with similar channel conditions, aggregation level requirement, or MCS are grouped into a same group.

24. The method of claim 21, wherein the indicator of resource allocation comprises a group Physical Downlink Control Channel (PDCCH) for allocating resources for a particular group of the grouping.

25. The method of claim 24, further comprising transmitting a separate group PDCCH for each group of the grouping.

26. The method of claim 24, wherein the indicator of resource allocation includes a bitmap indicating which UEs in the particular group reported a negative acknowledgement for a prior downlink transmission.

27. The method of claim 26, wherein the indicator of resource allocation further includes a starting and ending resource index for resources assigned to the particular group.

28. The method of claim 26, wherein the indicator of resource allocation further includes a starting resource index and a number of resources allocated to each UE within the particular group that reported a negative acknowledgement for a prior downlink transmission.

29. An apparatus for wireless communications, comprising: a processor; memory coupled with the processor; and instructions stored in the memory and operable, when executed by the processor, to cause the apparatus to: receive a plurality of acknowledgement reports from a plurality of user equipments (UEs), the plurality of acknowledgement reports acknowledging whether a downlink transmission was received by UEs in the plurality of UEs; determine, based on a grouping of the plurality of UEs, a resource allocation for each UE in the plurality of UEs from which a negative acknowledgement was received; and transmit an indicator of the resource allocation, wherein the indicator of the resource allocation includes a bitmap indicating which UEs in the plurality of UEs reported a negative acknowledgement for a prior downlink transmission.

30. The apparatus of claim 29, further comprising instructions operable to determine the grouping based on at least one of channel conditions, aggregation level requirement, or modulation and coding scheme (MCS) for each UE in the plurality of UEs.

31. The apparatus of claim 30, wherein UEs with similar channel conditions, aggregation level requirement, or MCS are grouped into a same group.

* * * * *